United States Patent [19]
Johnson et al.

[11] Patent Number: 5,182,449
[45] Date of Patent: Jan. 26, 1993

[54] SYSTEM AND METHOD FOR STRUCTURAL MONITORING USING OPTICAL IMAGING OF FIBER SENSORS

[75] Inventors: Allan H. Johnson, Derby, Kans.; Donald A. Woodbridge, San Ramon, Calif.

[73] Assignee: The Boeing Corporation, Seattle, Wash.

[21] Appl. No.: 660,258

[22] Filed: Feb. 26, 1991

Related U.S. Application Data

[63] Continuation-in-part of Ser. No. 475,861, Feb. 6, 1990, abandoned.

[51] Int. Cl.⁵ .................................................. H01J 5/16
[52] U.S. Cl. ................................... 250/227.14; 73/800
[58] Field of Search ..................... 250/227.14–227.19, 250/231.1, 227.20; 73/705, 800

[56] References Cited

U.S. PATENT DOCUMENTS

| | | |
|---|---|---|
| 3,910,105 | 10/1975 | Hoffstedt . |
| 4,283,114 | 8/1981 | Wandrack .............................. 73/705 |
| 4,336,595 | 6/1982 | Adams et al. . |
| 4,603,252 | 7/1986 | Malek et al. .......................... 73/800 |
| 4,629,318 | 12/1986 | Malek et al. . |
| 4,651,074 | 3/1987 | Wise ................................... 250/231.1 |
| 4,692,610 | 9/1987 | Szuchy . |
| 4,836,030 | 6/1989 | Martin ................................... 73/800 |
| 4,840,481 | 6/1989 | Spillman, Jr. . |
| 4,900,920 | 2/1990 | Federmann et al. ............ 250/231.1 |
| 5,029,977 | 7/1991 | Wheeler et al. ..................... 73/800 |

OTHER PUBLICATIONS

Zavodskaya Laboratoriya (U.S.S.R.), translated in Industrial Lab, vol. 36, No. 1, published Jan. 1970.

Primary Examiner—David C. Nelms
Assistant Examiner—K. Shami
Attorney, Agent, or Firm—Finnegan, Henderson, Farabow, Garrett & Dunner

[57] ABSTRACT

A sensor system for a structure includes at least one laser diode or LED light source coupled to a bundle of optical fibers, optical sensors integral with the structure and coupled to optical fibers wherein the sensors are adapted for modulating the intensity, frequency and phase of the optical signals in response to strain, temperature, pressure or another stimulus, a CCD video camera for collecting the modulated optical signals from optical fibers which are formed into a bundle representing a distinct structural area, and either a video monitor for visually evaluating the sensor data or a digital computer for image processing of the data.

22 Claims, 4 Drawing Sheets

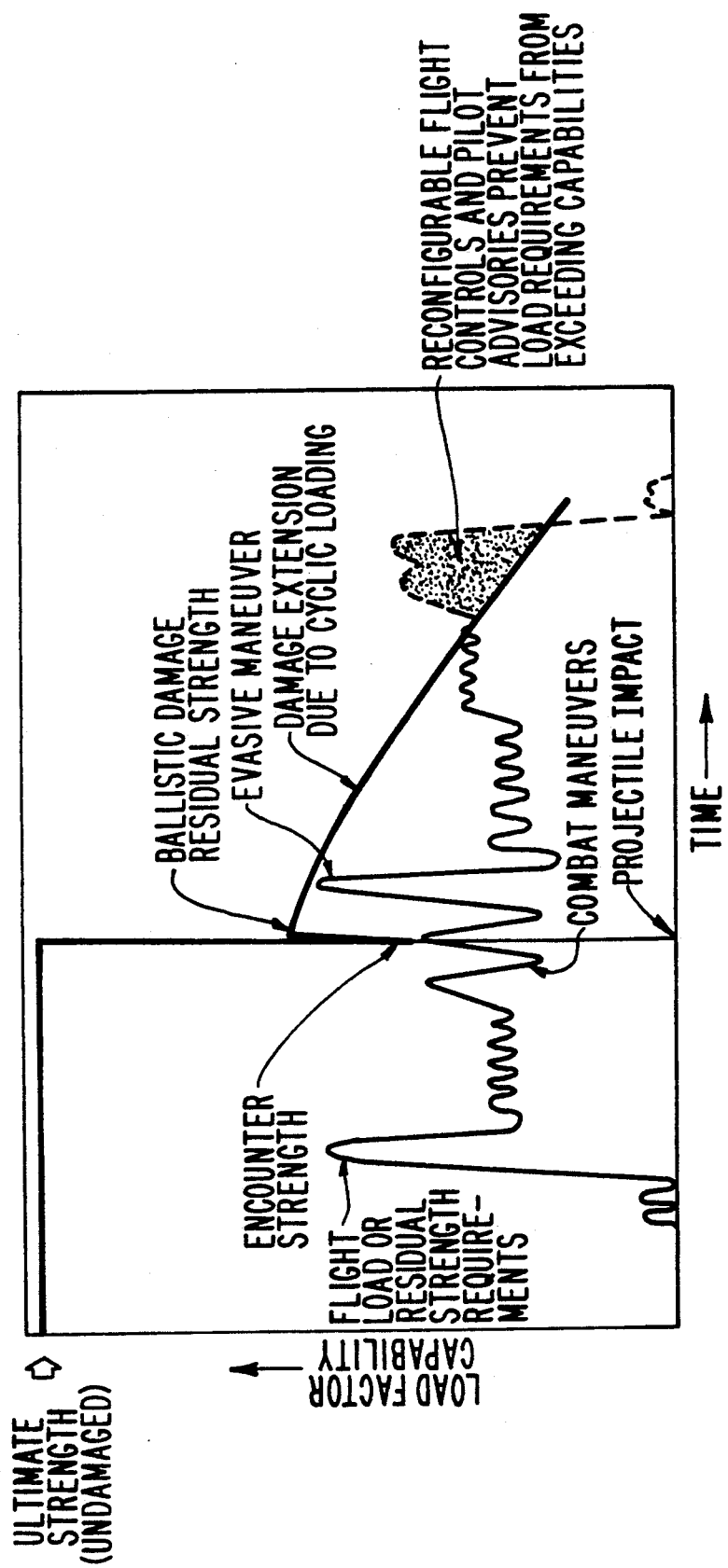

SYSTEM AND METHOD FOR STRUCTURAL MONITORING USING OPTICAL IMAGING OF FIBER SENSORS

This application is a continuation-in-part of application Ser. No. 07/475,861 filed Feb. 6, 1990 now abandoned.

BACKGROUND OF THE INVENTION

1. Field of the Invention

The invention relates to a method and a system for measuring stress and other parameters in a structure.

2. Description of Related Art

When a new aircraft is placed in service, the manufacturer estimates a useful life for the airframe. In order to determine the useful life, the manufacture designs, builds and tests structures for the spectrum of stresses expected to be encountered during the operation of the aircraft. The tests verify failure limits and fatigue damage rates for the structure and serve as a basis for a best estimate of the structural life with safety factors included.

When a large fleet of production aircraft is involved, the stresses and environment to which an individual airplane is subject varies widely. An airplane which has been subjected to a harsh stress environment will reach the end of its structural life thousands of flight hours before an aircraft which has been operated in a benign stress environment. Currently, fleet-wide Individual Aircraft Tracking (IAT) and Loads Environmental Survey systems are installed in DoD aircraft to monitor usage and provide data for fatigue life expenditure and potential crack growth calculations. Periodic inspections are required to determine the flight worthiness of each particular aircraft. Occasionally, these inspections result in an unsafe airplane being flown or a safe airplane being grounded. This method of fatigue life appraisal is labor intensive, requires substantial aircraft out of service time, and is a major contributor to the high life cycle costs of manned aircraft weapon systems.

As a method of avoiding these problems, "smart structures" have been proposed which typically consist of aircraft structural members with multiple embedded or attached sensor elements, and some method of collecting, analyzing and recording information regarding the structural integrity and stress history of the airframe. For smart structures to be relied on for mission or flight critical decisions, all essential flight critical structural elements must be monitored and integrity assessed in real time. Accomplishing this requires a large number of individual sensors with output measured and structural integrity assessed in real time. Current methods are only able to monitor a limited number of sensors with structural integrity assessments accomplished later by ground based computers.

SUMMARY OF THE INVENTION

The advantages of the invention will be set forth in part in the description which follows, and in part will be obvious from the description, or may be learned by practice of the invention. The advantages of the invention will be realized and attained by means of the elements and combinations particularly pointed out in the appended claims.

In accordance with the present invention, as embodied and broadly described herein, a sensor system for a structure comprises: a light source; means coupled to the light source for guiding optical signals; a plurality of optical sensors integral with the structure and coupled to the guiding means, the sensors being adapted to modulate respective ones of said optical signals in response to stimuli from the structure; means for directing the modulated optical signals; an optical detector coupled to the directing means, the detector being adapted to form a video image; and means coupled to the optical detector for processing the formed image.

As preferably embodied herein, the optical detector includes a video camera, and the processing means a digital computer programmed for image processing.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate an embodiment of the aspects and features of the invention, and together with the description, serve to explain the principles of the invention.

FIG. 7 depicts a use for the data generated by a system according to the invention.

DESCRIPTION OF THE PREFERRED EMBODIMENT

Reference will now be made to the presently preferred embodiment and implementation of the invention, as illustrated in the accompanying drawings. Whenever possible, the same reference numbers will be used throughout the drawings to refer to the same or like parts.

Figure 1:
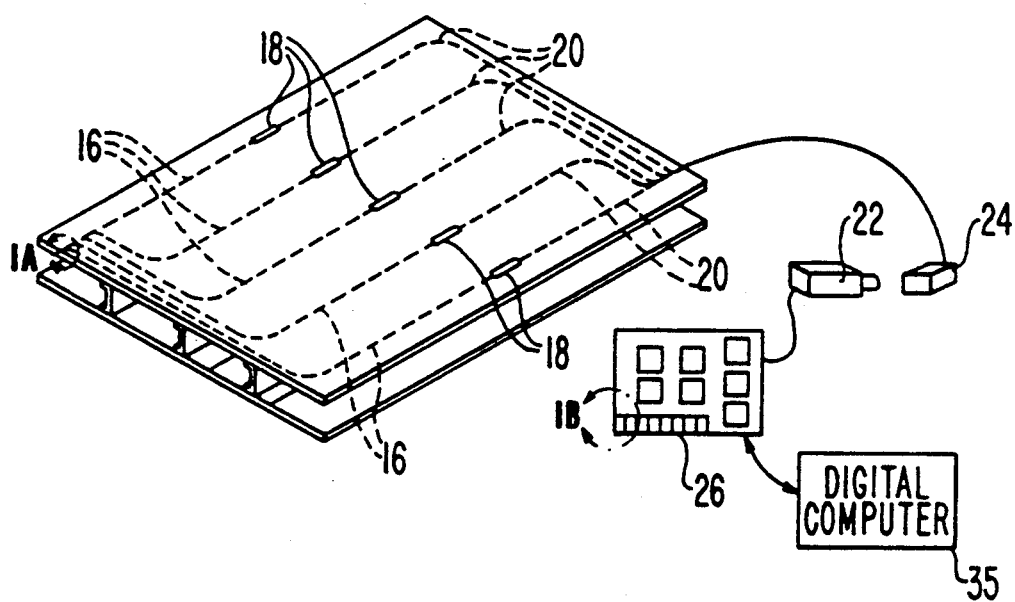
FIG. 1 is a conceptual depiction of a system according to the invention.
Figure 1A:
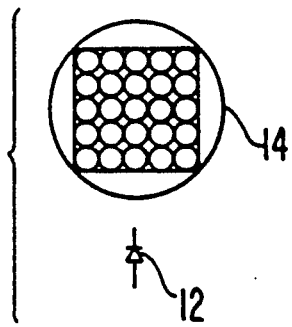
Figure 1B:
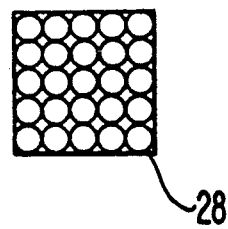

In accordance with the invention, a sensor system for a structure comprises a light source. As embodied herein and shown in FIG. 1, light source 12 may be either a Laser Diode, an LED, or other suitable source.

In accordance with the invention, a sensor system for a structure further comprises means coupled to the light source for guiding optical signals. As embodied herein and shown in FIG. 1, the guiding means comprises a first set of optical fibers 16. Optical fibers 16 are preferably coupled to light source 12 in a bundle 14. By coupling the light source into a fiber optic bundle rather than into individual fibers, the number of light sources required by a system with many fibers is greatly reduced.

In accordance with the invention, a sensor system for a structure further comprises a plurality of optical sensors integral with the structure. The optical sensors are coupled to the guiding means and are adapted to modulate the optical signals in response to stimuli from a structure. As embodied herein and shown in FIG. 1, the optical fibers 16 coupled to the light source 14 are also coupled to the sensors 18.

Optical sensors are known in the art (U.S. Pat. No. 4,840,481 to Spillman, Jr., for example). The sensors can be adapted to modulate light in response to various stimuli. As preferably embodied herein, the sensors are designed to sense strain in the structure. Furthermore, the sensors may be adapted to modulate the light in different ways so as to encode multiple signals. For example, strain may be encoded by intensity, pressure by frequency and temperature by phase.

Figure 2A:
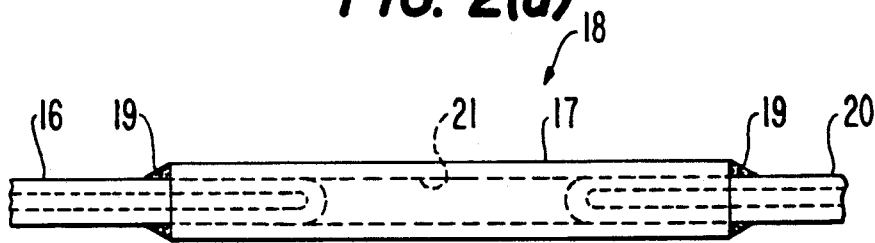
FIG. 2(a) and 2(b) are depictions of alternative embodiments of a strain gage for use in the invention.
Figure 2B:
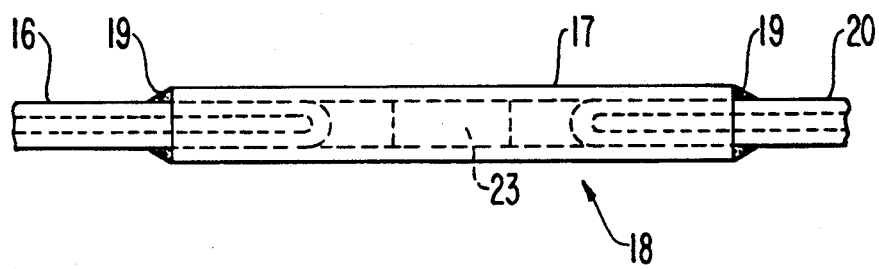

Suitable optical sensors for use in the system of this invention modulate the intensity of light as a function of strain. A preferred configuration would allow an additional parameter to be measured by frequency modulation of the light. The preferred sensor 18 configuration uses two fibers 16 and 20 coupled together by sleeve 17, as shown in FIGS. 2(a) and 2(b). The fibers are attached to the sleeve by an adhesive 19. The adhesive must be of sufficient viscosity so that it will not penetrate (or so that penetration can be controlled) between the sleeve and the optical fiber. The characteristics of the optical fibers can be adjusted to match the medium the sensor is to be used in and the function it is to perform. For example, a 125 $\mu$ multimode fiber with a polymide coating matches the ply thickness, is chemically compatible with, and has been used to measure strain in a IM6/3501 GR/Epoxy composite laminate. Fiber size and interface material are selected based on chemical and processing compatibility with structure material.

Figure 3A:
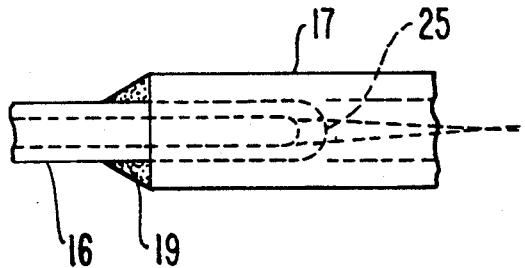
FIGS. 3(a) and 3(b) are depictions of fiber ends as used in the strain gages of FIGS. 2(a) and 2(b).
Figure 3B:
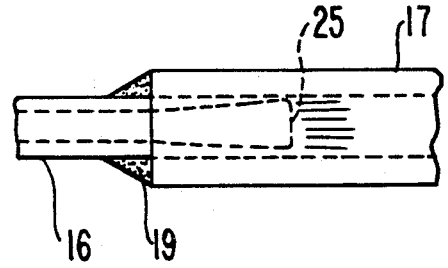
Figure 4:
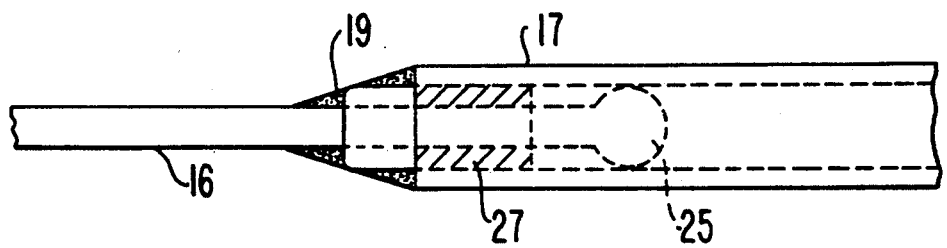
FIG. 4 depicts a strain gage having an optical fiber with a large fused end.

In order to allow measurement of additional parameters, the cavity within the sleeve 17 is either coated 21 (FIG. 2(a)) with a substance or contains a filter 23 (FIG. 2(b)) which modulates the light frequency as a function of temperature or pressure. Additionally, the ends 25 of the optical fibers 16 are preferably fused (FIG. 3(a)) to form a lens. Alternatively, the fiber ends 25 may be cleaved (FIG. 3(b)). If cleaved, the light emanating from the fiber end is diffused. If the fiber ends 25 are fused so that they are larger in diameter than the fiber 16 (FIG. 4), it becomes necessary to install the fiber in the sleeve 17 with an alignment capillary 27. The alignment capillary can be used with either cleaved or fused ends to increase the size of the cavity for tailoring sensor performance characteristics.

The sleeve of the strain gage splices the fiber ends together with a specific gap between the fiber ends. The sleeve length is the effective gage length for strain measurements. The gap between the fiber ends will change by the same amount as the sleeve when the sleeve is strained, and the light intensity will change with the gap length.

Figure 5A:
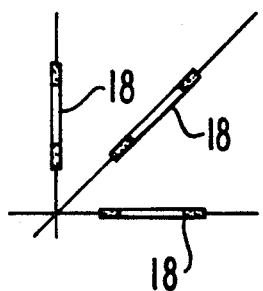
FIGS. 5(a) and 5(b) are depictions of sensor arrangements for use in the invention.
Figure 5B:
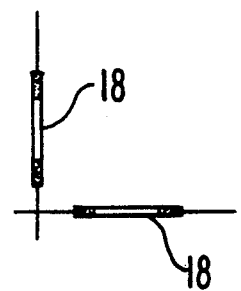

Complex strain fields can be measured by arranging combinations of uni-axial strain sensors, as shown by example in FIG. 5. A three gage shear Rosette (FIG. 5(a)) may be used to monitor at 0°, 45° and 90° or 0°, 120° and 240°. A two gage combination (FIG. 5(b)) may be used for bi-axial strain (0° and 90°). Furthermore, the sensor can be either attached to the surface of a structure or embedded within a composite structure.

In accordance with the invention, a sensor system for a structure comprises means for directing the modulated optical signals. As embodied herein and depicted in FIG. 1, the directing means preferably comprises a second set of optical fibers 20 over which the modulated optical signal is transmitted. In the preferred embodiment, optical sensors 18 act to modulate the optical light signals and to serially couple light from the first set of optical fibers 16 into the second set 20.

Figure 6:
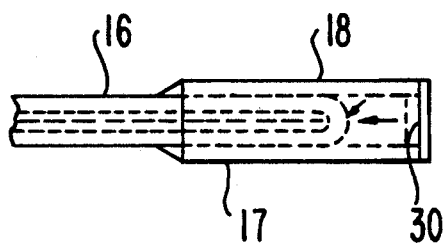
FIG. 6 depicts a sensor containing means for reflecting the optical signal.

Alternatively, as shown in FIG. 6, the directing means includes the first set of optical fibers 16 in conjunction with means for reflecting, or retro-directing, the optical signal. The means for reflecting the optical signal includes a reflector 30 in sensor 18 within sleeve 17.

In accordance with the invention, a sensor system for a structure further comprises an optical detector coupled to the directing means. The optical detector is adapted for forming a video image. As embodied herein and shown in FIG. 1, the optical detector includes video camera 22 coupled to the bundle 24 of optical fibers 20. The video camera preferably consists of a Charge Coupled Device (CCD). This device is to function as a detector with the capability to detect a broad range of at least one of light intensity, frequency and phase shift. Other detectors, as known in the art, could be substituted. In any case, the frequencies of the optical light source should be matched with the detecting capability of the optical detector. CCD cameras consist of a two-dimensional array of independent optical detectors integrated into a single monolithic substrate. The detector array can be scanned such that the individual output of each detector is made available in a continuous serial data stream. CCD video cameras have become widely available and form the basis of most consumer "camcorders" as well as a host of surveillance and closed circuit television camera applications. Typical CCDs have up to 1024 × 1024 detectors (which are also known as "pixels" or picture elements).

A commercial CCD camera may be used in the system of this invention. However, depending on the number of sensors desired in the structure, the slightly over 1 million pixels offered by some commercial CCD structures may not be required. In this case, it is preferable to have a CCD array which is smaller (i.e., fewer pixels) than available commercially. When the number of pixels is reduced, the rate of processing may be increased because there are fewer pixels to scan. A low monitoring frequency (<60 Hz) for the individual pixels is thought to be sufficient; however, a higher monitoring frequency may be desirable.

The bundle of fibers is preferably arranged to represent an array of sensors grouped to monitor a specific area of the structure, such as the wing upper skin. The bundle is coupled into the camera by an adhesive having an index of refraction intermediate between that of the optical fiber and the camera lens so that reflection of the light is reduced. The bundle is further arranged such that each individual fiber is imaged by one or multiple pixels. If multiple pixels are used for each fiber, it is necessary to combine multiple pixel responses into a single output value by some mathematical process (for example, averaging). The combined response would then be processed to determine the output value (strain, temperature, etc.) for the sensor connected to that particular fiber. The intensity, frequency, and phase of the light from the optical fiber can be determined, and therefore, the pixel array represents an array of the parameters being sensed over the area where the sensors are located.

In accordance with the invention, a sensor system for a structure further comprises means coupled to the optical detector for processing the formed image. As embodied herein and shown in FIG. 1, the processing means consists of a video processing printed circuit board (PCB) 26 which receives the serial pixel data from the CCD array, and forms a complete digital image as a two-dimensional array within its electronic memory. The means for processing further consists of a conventional digital computer 35 programmed for image processing as known in the art. The digital image formed within the memory of the video processing PCB 26 is processed by the digital computer 35. The processing establishes the instantaneous condition of the structure over the area where the sensors are located. Several of these local processing systems can be coupled to a global digital processor which compares the measured data to stored data representative of airframe stress limits for the complete airframe to provide structural assessment in real time. The global processor could be a separator processor or a sophisticated flight control computer as used in modern fly-by-wire or fly-by-light systems. In any case, the comparison information could be passed to the flight control computer which could then change the flight control surfaces to reduce stress on damaged sections of the airframe.

The image processing begins with a baseline image of the sensor system being developed prior to subjecting the sensors to stimuli. For example, in an aircraft application, a video image of all of the sensor outputs of strain would be created when the aircraft was on the ground. Once the structure is stressed, the sensor readings would be compared against the baseline image. If a pre-programmed threshold value is exceeded, then further processing would be performed to determine the stressed state of the structure or structural capacity for load if damage had occurred. The processing performed by the system should take into account the functional relationship (i.e., the non-linearities) between the sensor output and the parameter being measured for the particular type of sensor used, and the final processed output for each fiber would be a number which represents a calibrated measured value for the desired parameter.

In operation, the light source 12 sends light into sensors 18 which modulate the light, for example, by changing the intensity as a result of the strain in the structure. The modulated light is redirected, in this case guided, and coupled into video camera 22. The image 28 produced by the video camera is an array of the data from the sensors. For example, in FIG. 1, black indicates a broken fiber representing structural damage, gray indicates high strain and white indicates low strain. This data is then processed and compared to the baseline sensor image to determine elevated stress levels and the resulting ultimate strength of the structure. The processed structural data may be passed to the aircraft's central processor which could assess the entire airframe condition (as shown in FIG. 7) and interface with the other aircraft systems such that advisories could be passed to the flight control processors which could then reconfigure to lower stress in the damaged area. Advisories on aircraft limitations could be passed to the flight crew via the mission processors. Furthermore, the system would store the image of critical data generated throughout the flight so that it can be dumped to a ground recorder for later analysis.

The image processing of this invention provides the only known way of handling the multitude of sensors needed to adequately cover an aircraft structure and provide the needed redundancy. The invention allows data from the sensors to be processed with a reasonable amount of equipment and within a reasonable amount of time.

Further benefits of smart structures can be realized if the signals from the centers are processed and the information regarding local structural integrity status are fed into a central computer (flight control) where the overall state of the airframe is assessed, advisories sent to the flight crew, and flight control is reconfigured to minimize loads on damaged structural components. FIG. 7 depicts a scenario where coupling a smart structure with flight control system could prevent the loss of an aircraft. The system and method described in this invention could use a video camera (CCD) to record an image of the simultaneous output of multiple (i.e., thousands) of strain/temperature sensors arranged in or on a structural component. The instantaneous image becomes a map of strain or temperature where dim spots on the image indicate high strains and dark spots would indicate failed structure. The processing would consist of comparing recorded images with stored maps representing allowable strains. These allowable strains would also serve to establish limits on loads to prevent over-stress and failure around damaged structure.

For a complete smart aircraft structure, several local image processing systems would be networked to provide the integrity and stress state of all of the critical structure in an airplane. This net working could be accomplished by coupling local distributed processors to the light control/mission computers for global structural integrity assessment with capability to provide advisories to the flight crew and interaction with other systems to limit airframe loads for prevention of damaged aircraft failures. The method and system described by this invention to map signals from a multitude of sensors integrated with the structure into a series of instantaneous images portraying the stress state of a structure, is the only known way to achieve a computation capacity adequate to assess the integrity of the entire airframe in real time.

The resulting network of fibers arranged throughout the structure could also provide a means for universal communication between all aircraft systems without the need for additional fiber optic conduits. The broad frequency band widths achievable with optical signals would allow the sensor to function by causing small variations in frequency, intensity or phase while multiple communications channels are maintained with wide separation in frequency. This concept allows all the information to be broadcast through these optical conduits so that inter-system communications could be achieved by coupling to the network of fibers at any point in the aircraft.

It will be apparent to those skilled in the art that various modifications and variations could be made to this sensor system without departing from the scope or spirit of the invention.

Other embodiments of this invention will be apparent to those skilled in the art from consideration of the specification and practice of the invention disclosed herein. It is intended that the specification and examples be considered as exemplary only, with the true scope and spirit being indicated by the following claims.

What is claimed:

1. A sensor system for a structure comprising:
   a light source;
   a plurality of means coupled to said light source for guiding optical signals;
   a plurality of optical sensors integral with the structure and respectively coupled to said guiding means, said sensors being adapted to modulate respective ones of said optical signals in response to stimuli from the structure;

a plurality of means for directing the modulated optical signals;

an optical detector coupled to said plurality of directing means, said detector being adapted to form a video image; and means coupled to said optical detector for processing the formed image.

2. A sensor system as recited in claim 1 wherein said optical detector comprises a video camera.

3. A sensor system as recited in claim 2 wherein said video camera comprises a Charged Coupled Device.

4. A sensor system as recited in claim 1 wherein said processing means comprises a digital computer.

5. A sensor system as recited in claim 1 wherein said processing means comprises a video processing circuit board capable of forming a two dimensional array.

6. A sensor system as recited in claim 1 wherein said optical sensors modulate the intensity of said optical signals.

7. A sensor system as recited in claim 6 wherein said optical sensors further modulate the frequency of said optical signals.

8. A sensor system as recited in claim 7 wherein said optical sensors further modulate the phase of said optical signals.

9. A sensor system as recited in claim 8 wherein one of the stimuli is strain.

10. A sensor system as recited in claim 2 wherein said guiding means comprises a first set of optical fibers and wherein said directing means comprises a second set of optical fibers serially coupled by said optical sensors to said first set of optical fibers.

11. A sensor system as recited in claim 1 wherein said guiding means comprises optical fibers and wherein said directing means comprises:
said optical fibers; and
means associated with said optical sensors for reflecting the optical signals.

12. The method of assessing the integrity of a structure, comprising the steps of:
coupling light into a plurality of optical sensors;
modulating the light in respective ones of said optical sensors in response to a stimuli;
coupling the modulated light from said optical sensors into a video camera, and
forming an array of signals representing the relative amount of modulation of the light from the respective optical sensors.

13. The sensor system as claimed in claim 1, wherein the plurality of sensors are attached to the structure.

14. The sensor system as claimed in claim 1, wherein the optical sensors are embedded in the structure.

15. The sensor system as claimed in claim 10, wherein said second set of optical fibers is coupled to a lens of said camera.

16. The method as recited in claim 12, further comprising steps of:
digitally processing the array of signals in order to assess the integrity of the structure; and
issuing advisories regarding the assessment.

17. A flight control system for controlling stress in an airframe including control surface, the system comprising:
a light source for generating a plurality of optical signals;
a plurality of means coupled to said light source for guiding said optical signals;
a plurality of optical sensors coupled to said guiding means, said sensors being adapted to modulate respective ones of said optical signals in response to stress-related stimuli from the airframe;
a plurality of means for directing the modulated optical signals to an optical detector;
said optical detector coupled to said plurality of directing means, said detector including means for generating data representative of airframe stress;
means coupled to said optical detector for comparing the generated data to stored data representative of airframe stress limits; and
means, responsive to the comparison, for setting control surfaces so that the airframe stress is maintained within limits.

18. A flight control system for setting control surfaces on an aircraft to control stress in an airframe, the system comprising:
a plurality of optical sensors for sensing stress in an airframe;
an optical detector coupled to said sensors, said detector including means for generating data representative of airframe stress;
means coupled to said optical detector for comparing the generated data to stored data representative of airframe stress limits; and
means, responsive to the comparison, for setting the control surfaces so that the airframe stress is maintained within limits.

19. The method of controlling airframe stress, comprising the steps of:
coupling light into a plurality of optical sensors;
modulating the light in respective ones of said optical sensors in response to a stress-related stimulus;
coupling the modulated light from said sensors into a video camera to form an array of signals representing the relative amount of modulation of light from the respective optical sensors and to convert the optical array to digital data;
digitally processing the digital data to assess the integrity of the structure;
issuing advisories regarding the assessment; and
setting control surfaces of the airframe in response to the advisories.

20. The method of setting aircraft control surfaces to control airframe stress, comprising the steps of:
modulating light representative of stress in the aircraft using sensors;
converting the modulated light to a digital electrical signal using a video camera;
processing the digital signal to assess the level of stress in the structure; and
setting the control surfaces in response to the assessment of the level of stress.

21. A flight control system comprising:
optical sensors for sensing stress in an airframe;
an optical detector, coupled to the sensors for converting optical stress signals to digital stress signals;
a digital computer coupled to the optical detector for assessing the electrical stress signals and for issuing optical control signals to trim the airframe in response to the measured stresses; and
optical fibers coupled to said sensors, said detector and said computer and to the airframe for transmitting both said optical stress signals and said optical control signals.

22. The flight control system as claimed in claim 21 wherein the same optical fibers are used for transmitting both the optical stress signals and the optical control signals.

* * * * *